United States Patent [19]
Sakakura

[11] Patent Number: 5,999,615
[45] Date of Patent: Dec. 7, 1999

[54] TELEPHONE EXCHANGE SYSTEM AND SWITCHING CONNECTION METHOD IMPROVED IN EFFICIENCY FOR LONG-DISTANCE CALLING

[75] Inventor: Yukinori Sakakura, Tokyo, Japan

[73] Assignee: NEC Corporation, Japan

[21] Appl. No.: 09/123,834

[22] Filed: Jul. 28, 1998

[30] Foreign Application Priority Data

Jul. 30, 1997 [JP] Japan ..................................... 9-204145

[51] Int. Cl.⁶ ..................................................... H04M 7/00
[52] U.S. Cl. ............................. 379/219; 379/207; 379/229
[58] Field of Search ..................................... 379/207, 219, 379/220, 221, 229, 230

[56] References Cited

U.S. PATENT DOCUMENTS 5,771,284  6/1998  Sonnenberg ......................... 379/219 X
5,878,126  3/1999  Velamuri et al. ........................ 379/219

FOREIGN PATENT DOCUMENTS 9204145  7/1997  Japan .

Primary Examiner—Creighton Smith
Attorney, Agent, or Firm—Ostrolenk, Faber, Gerb & Soffen, LLP

[57] ABSTRACT

A telephone exchange system comprises out-of-town exchanges and local exchanges, the local exchange keeping a communication channel established between a telephone and an out-of-town exchange without breaking the communication channel until satisfying a predetermined condition even if the telephone is on the hook when the connection has been established between the out-of-town exchange and the telephone having made a call, the out-of-town exchange keeping a communication channel established between a local exchange or an out-of-town exchange and the other out-of-town exchange or itself without breaking the communication channel until satisfying a predetermined condition even if the telephone is on the hook when the connection has been established between the local exchange or the out-of-town exchange that is a calling source and the out-of-town exchange or the local exchange that is a calling destination.

15 Claims, 12 Drawing Sheets

① CALL CONNECTION FROM THE SUBSCRIBER A TO THE OUT-OF-TOWN EXCHANGE TS-B
② CALL CONNECTION FROM THE OUT-OF-TOWN TS-B TO THE SUBSCRIBER B
③ CALL CONNECTION FROM THE OUT-OF-TOWN TS-B TO THE SUBSCRIBER C
④ CALL CONNECTION FROM THE OUT-OF-TOWN TS-B TO THE SUBSCRIBER D

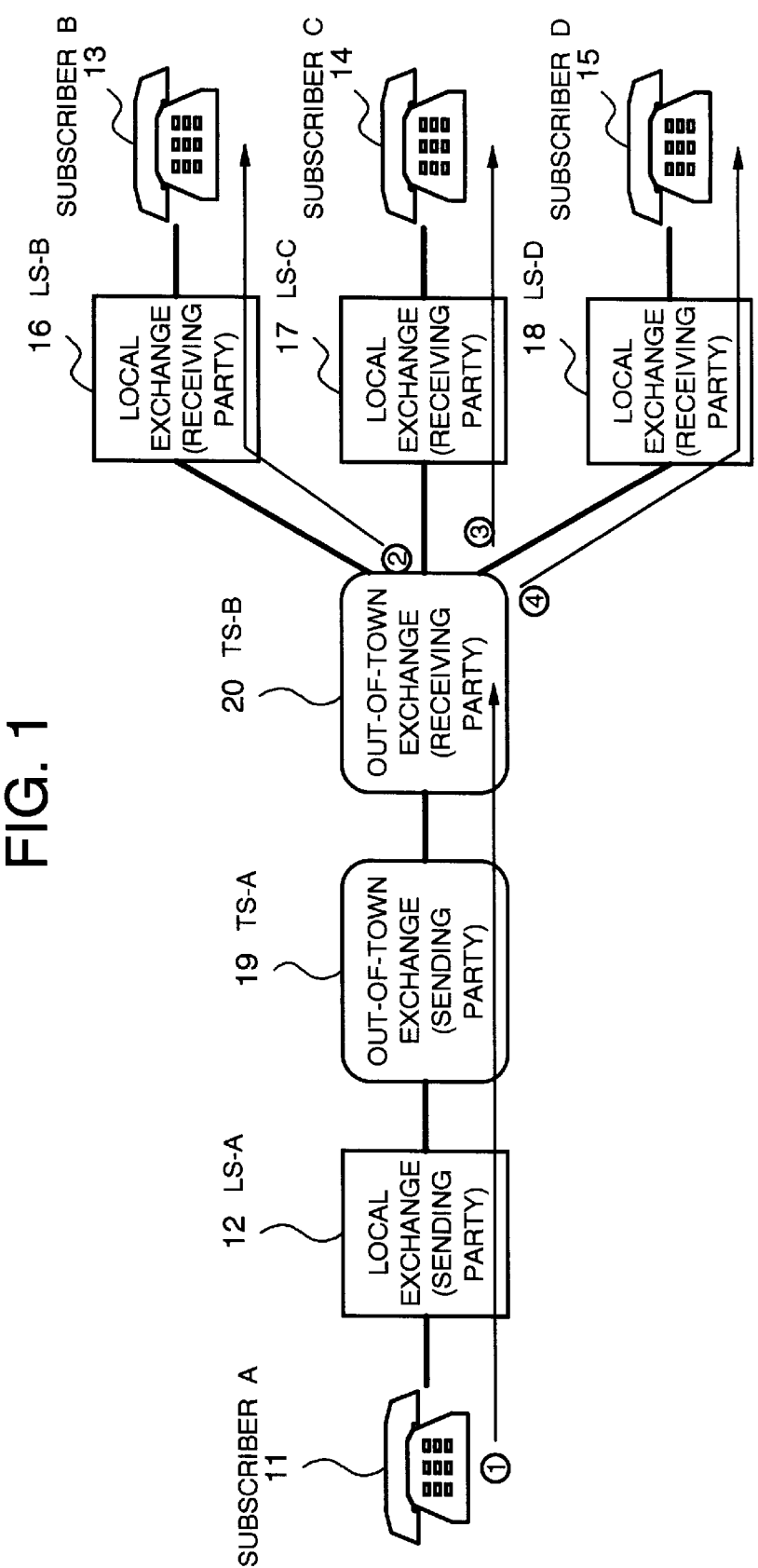

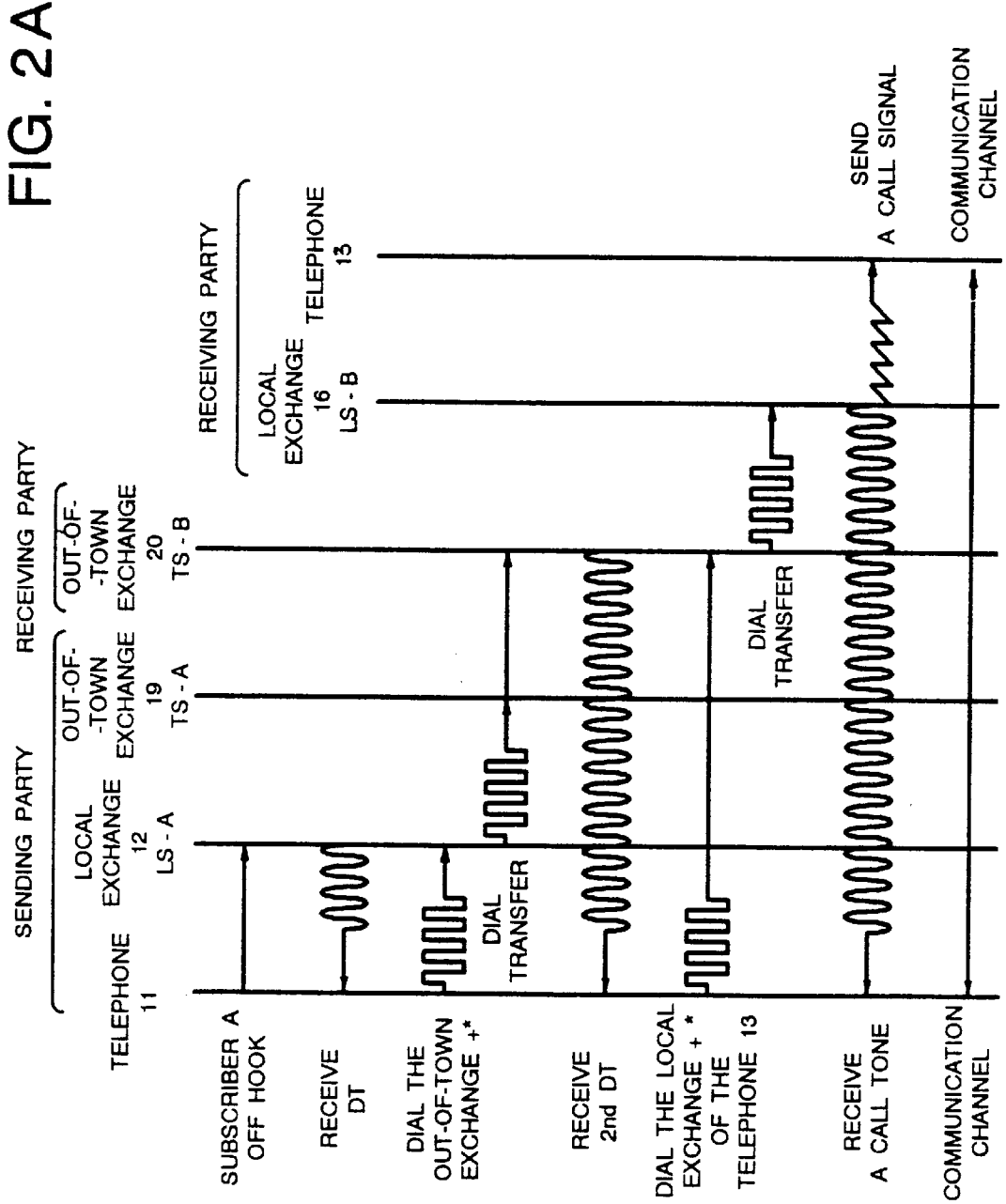

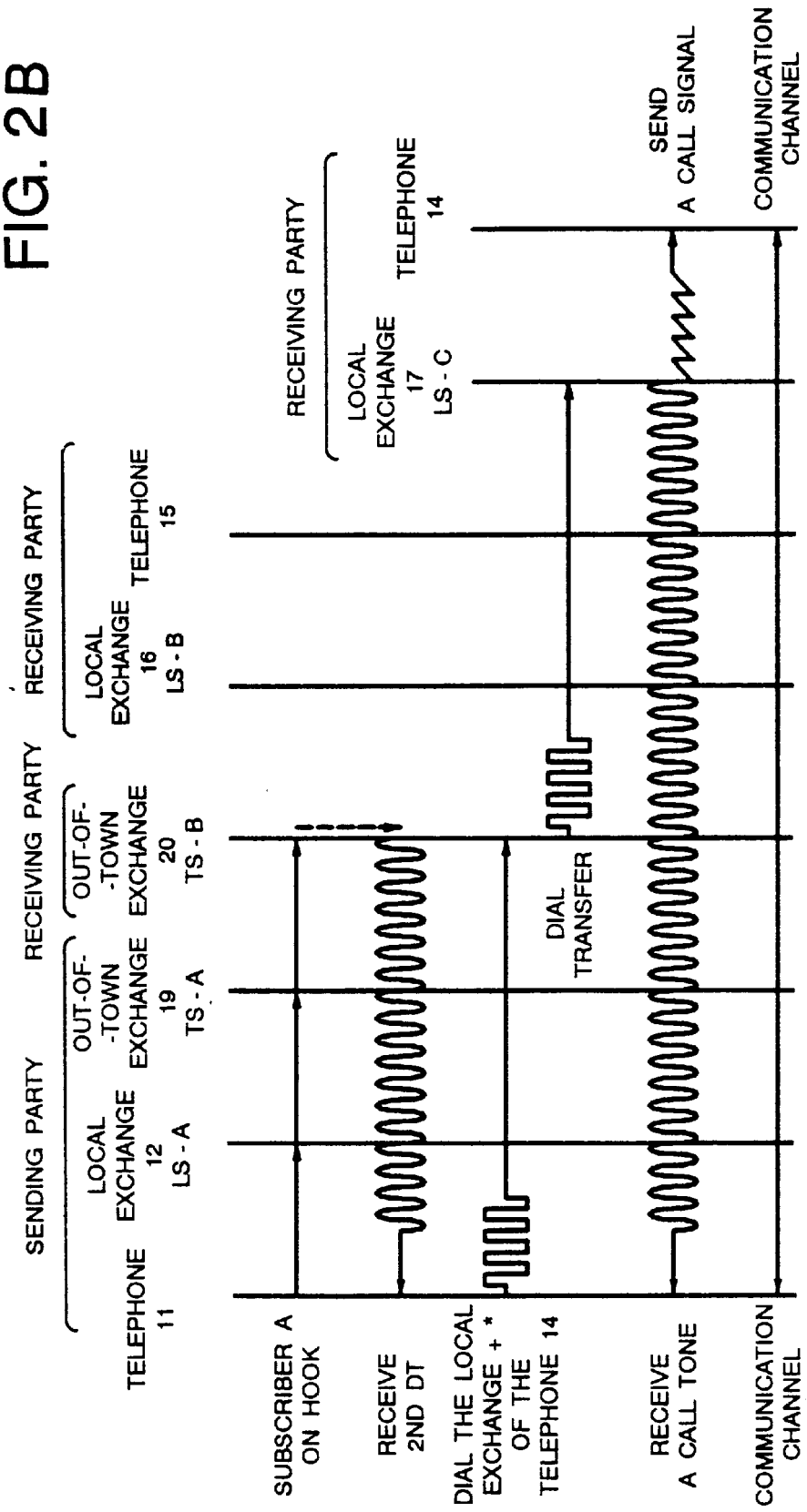

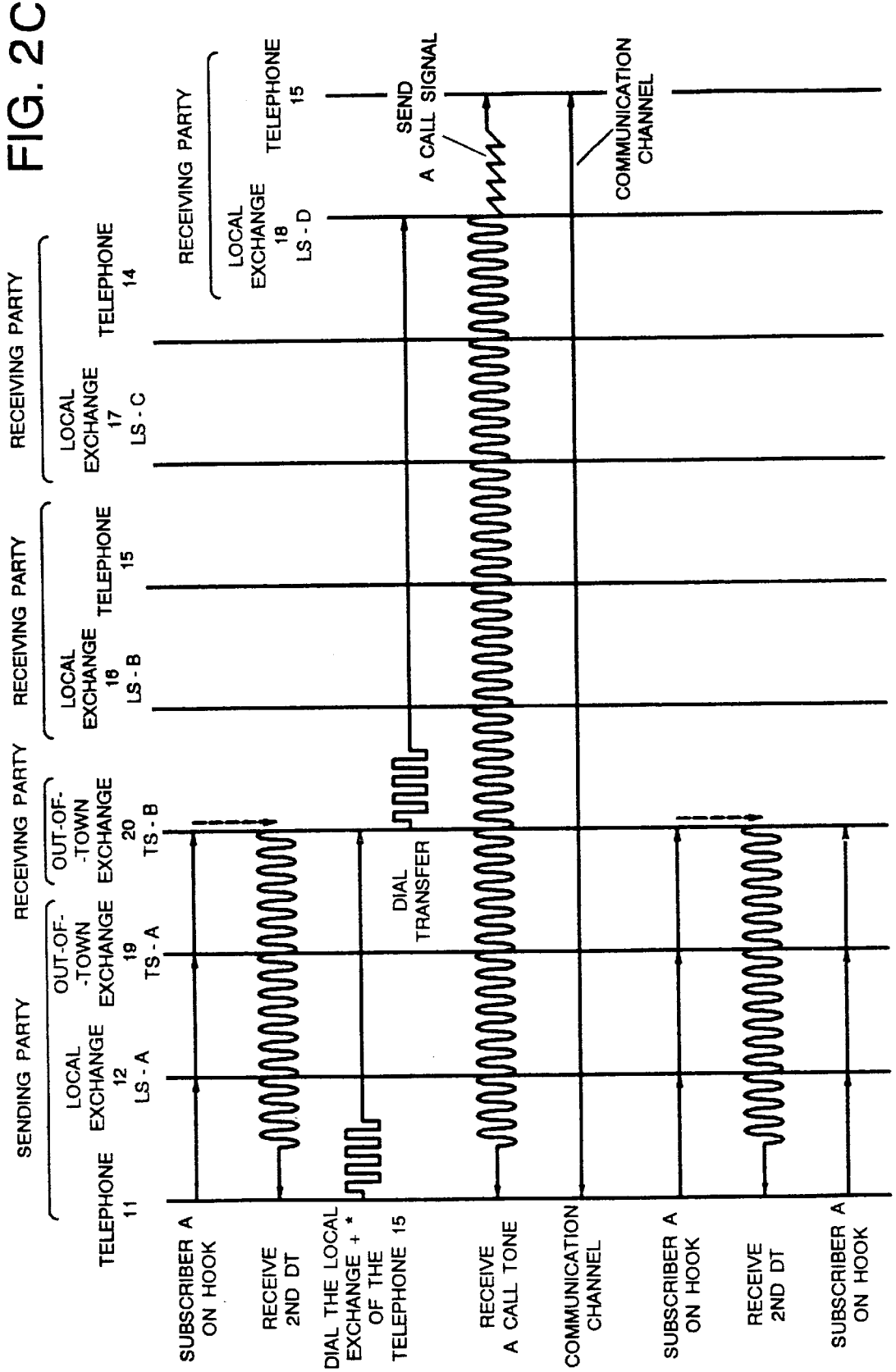

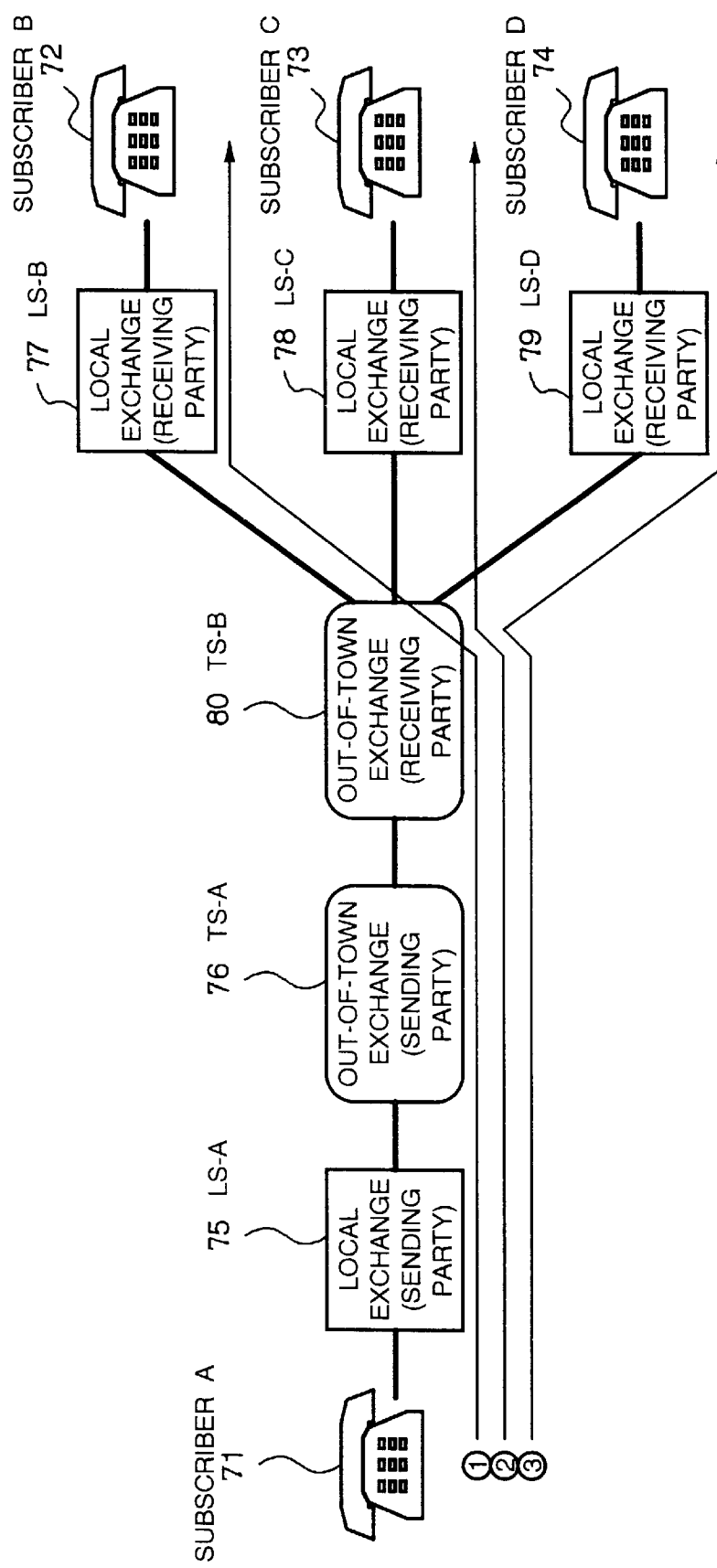

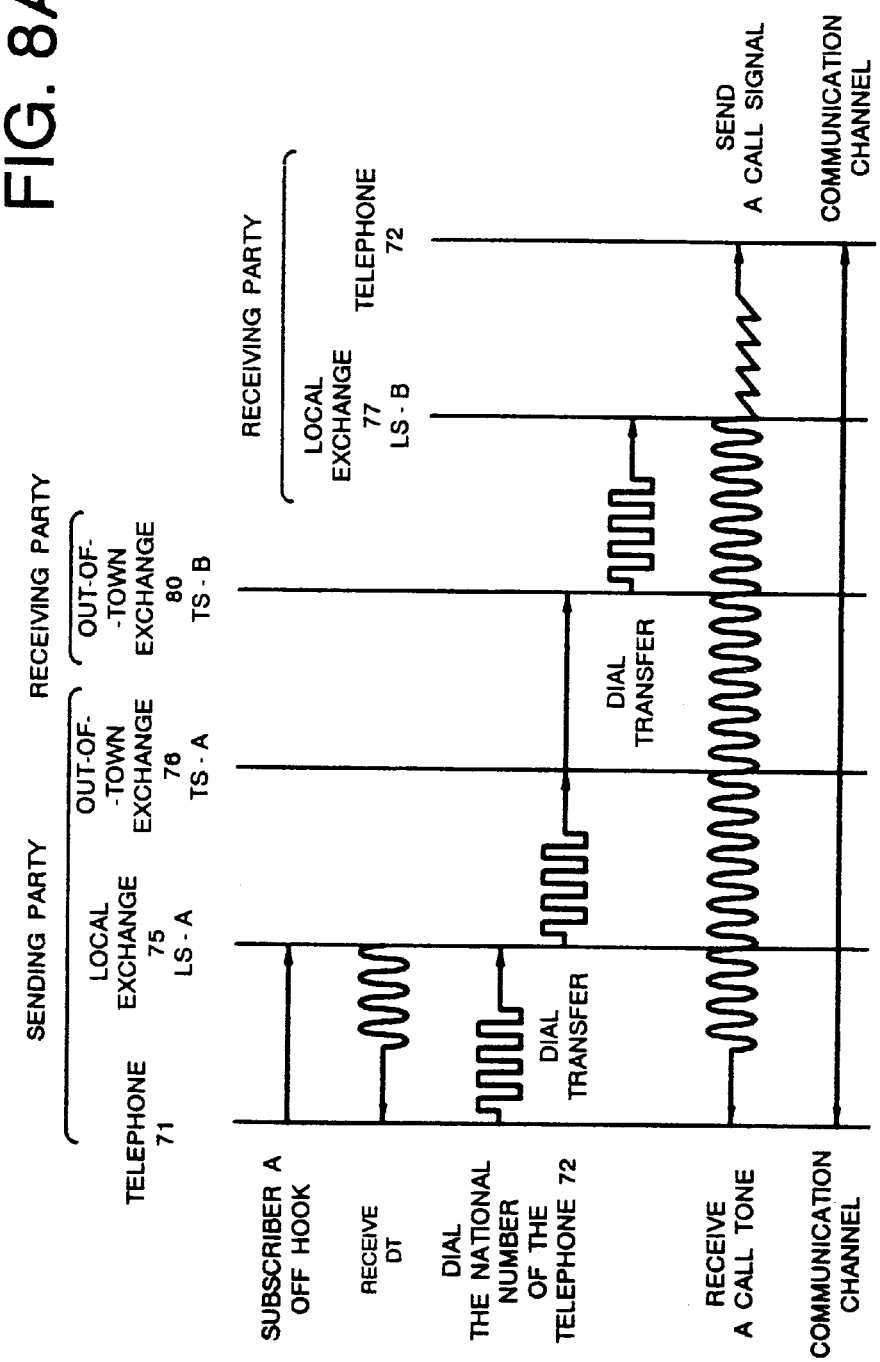

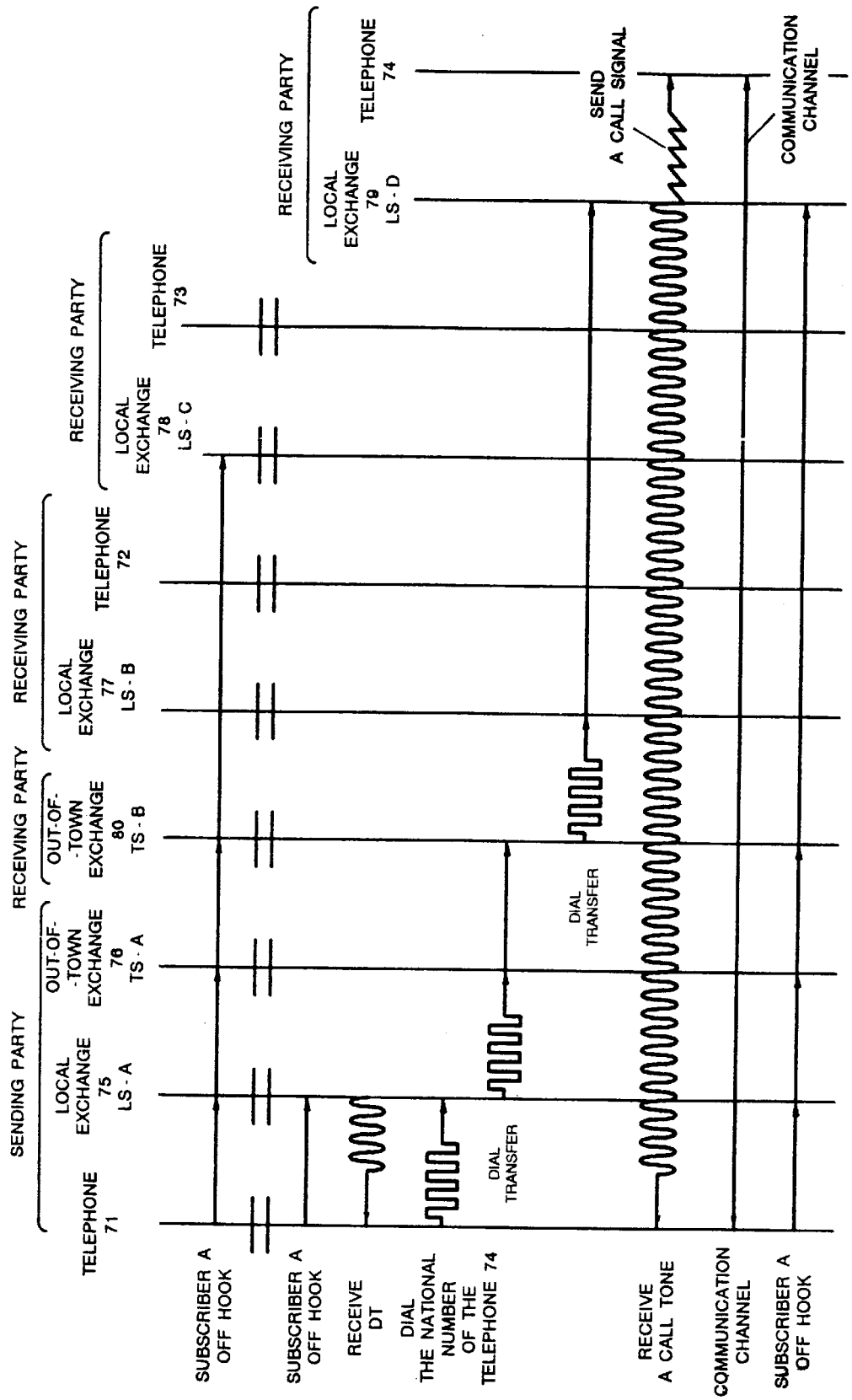

TELEPHONE EXCHANGE SYSTEM AND SWITCHING CONNECTION METHOD IMPROVED IN EFFICIENCY FOR LONG-DISTANCE CALLING

BACKGROUNDS OF THE INVENTION

1. Field of the Invention

The present invention relates to a telephone exchange system and A switching connection method for performing a switching connection among telephones and various kinds of exchanges in a telephone line, and more particularly to a telephone exchange system and its switching connection method capable of performing an efficient switching connection when successively making calls on a plurality of telephones having an identical out-of-town telephone exchange.

2. Description of the Related Art

The description will be made in the case where a predetermined subscriber successively phones a plurality of subscribers of an out-of-town exchange other than the sending party's out-of-town exchange, by use of the conventional exchange system, on a telephone line. As illustrated in FIG. 7, assume that a subscriber (A) having a telephone 71 successively makes a call to a subscriber (B) having a telephone 72, a subscriber (C) having a telephone 73, and a subscriber (D) having a telephone 74.

With reference to FIG. 7, the telephone 71 is accommodated in a local exchange (LS-A) 75 and the local exchange 75 is connected to an out-of-town exchange (TS-A) 76. The telephone 72 is accommodated in a local exchange (LS-B) 77, the telephone 73 is accommodated in a local exchange (LS-C)78, and the telephone 74 is accommodated in a local-exchange (LS-D) 79, respectively. The local exchanges 77, 78 and 79 are respectively connected to an out-of-town exchange (TS-B) 80. Further the out-of-town exchange 76 is connected to the out-of-town exchange 80.

In order to phone the subscriber (B), the subscriber (A) dials the telephone number of the telephone 72 from the own telephone 71, that is out-of-town exchange number+local exchange number+subscriber phone number (hereinafter, this combination is referred to as a national number). This establishes a call connection through the path ①, enabling communication between the telephones 71 and 72. After completion of the communication, the subscriber (A) dials the national number of the telephone 73 from the telephone 71 in order to call the subscriber (C). This establishes a call connection through the path ②, enabling communication between the telephones 71 and 73. Further, after completion of this communication, the subscriber (A) dials the national number of the telephone 74 from the telephone 71 in order to call the subscriber (D). This establishes a call connection through the path ③, enabling communication between the telephones 71 and 74.

The control operation of each exchange when performing each call connection as mentioned above will be described with reference to FIG. 8. If the telephone 71 is off the hook by the subscriber (A), the local exchange 75 detects the off-hook and transmits a dial tone (DT) to the telephone 71. The subscriber (A), upon confirmation of the dial tone, dials the corresponding national number of the telephone 72 by use of the dial button of the telephone 71. The local exchange 75, upon receipt of the dial signal from the telephone 71, transfers the dial signal to the out-of-town exchange 76, in order to transfer the dial signal to the out-of-town exchange 80 specified in the dial signal. The out-of-town exchange 76 transfers the dial signal to the out-of-town exchange 80 that is a corresponding exchange specified by the dial signal received from the local exchange 75. The out-of-town exchange 80 transfers the dial signal to the local exchange 77 corresponding to the local exchange number specified by the received dial signal. The local exchange 77 sends a call signal (RINGING) to the telephone 72 that is of the corresponding subscriber number specified by the received dial signal and sends a call tone (RGT) to the telephone 71.

Upon detection of the off-hook of the telephone 72, the local exchange 77 performs a call (communication channel) connection. This enables communication between the telephones 71 and 72. If the telephone 71 is on the hook, the local exchange 75 detects the on-hook of the telephone 71, a ring-off signal is transferred to the out-of-town exchange 76, the out-of-town exchange 80, and the local exchange 77 one after another, and the call is broken.

Each exchange performs the switching operation in the same procedure as the above, also in case of dialing from the telephone 71 to the telephone 73. The local exchange 78 performs the switching operation instead of the local exchange 77 in this case. Further, it is similar in case of dialing from the telephone 71 to the telephone 74. In this case, the local exchange 79 performs the switching operation instead of the local exchange 77.

As mentioned above, in the conventional telephone exchange system, it is necessary to dial each national number for every party when a telephone call is successively made to a plurality of subscribers existing in the identical area. Therefore, the connection is troublesome and time consuming.

In order to decrease the subscriber's trouble in dialing in every time of communication, it may be considered to use a dial shortening function and a redial function provided in a telephone. However, use of the dial shortening function is restricted to the case of calling the party having been registered beforehand, and the redial function is a function of dialing the same number of the party having been called last time. Therefore, it is not available in the above-mentioned case of calling each different party one after another. Though these functions can save the labor of a subscriber, they cannot shorten the time itself required for the switching connection, but they are only to dial the number instead of a subscriber.

The Japanese Patent Publication Laid-Open (Kokai) No. Heisei 1-168147 "Dialing Method by Exchange Difference in General Telephones" discloses a technique for shortening a dial operation by storing either an out-of-town exchange or a local exchange of the calling party when dialing a calling party, and when calling the same party later, automatically sending the stored out-of-town exchange or local exchange by a specified key operation. However, this technique cannot shorten the time required for a switching connection even if it can save the labor of a user.

SUMMARY OF THE INVENTION

An object of the present invention is to provide a telephone exchange system and a switching connection method for shortening the time required for a switching connection when successively making a call to a plurality of telephones having an identical out-of-town exchange.

Another object of the present invention is, in addition to the above object, to provide a telephone exchange system and a switching connection method capable of decreasing the labor of dial button operation.

According to a first aspect of the invention, the invention comprises a telephone exchange system for controlling a switching connection between telephones, having a plurality of out-of-town exchanges interconnected with each other, local exchanges connected to said out-of-town exchanges, and telephones connected to said local exchanges. The system operates whereby when a connection has been established between a first out-of-town exchange and a first telephone having issued a call, in reply to a call under a predetermined condition, the first telephone being associated with a first local exchange, said first local exchange keeps a communication channel established between said first telephone and said first out-of-town exchange without braking the communication channel until satisfying a predetermined breaking condition even if said first telephone is on the hook.

Further, when, in reply to a call under said predetermined condition, a connection has been established between at least one of said first local exchange and said first out-of-town exchange of a sending party of the call and one of a second out-of-town exchange and a second local exchange of a sending destination of the call, the second local exchange being associated with a second telephone, said first out-of-town exchange keeps a communication channel established between one of said first local exchange and said first out-of-town exchange and at least one of said second out-of-town exchange and said second local exchange without breaking the communication channel until satisfying said predetermined breaking condition even if said first telephone is on the hook.

Preferably, said first local exchange comprises: a first switching connection unit for performing a switching connection between said first telephone and said first out-of-town exchange, a first controller for controlling said first switching connection unit, a first operation signal detector for checking whether a dial signal having been sent from said first telephone includes an operation signal, and a first out-of-town exchange number recognizer for recognizing an out-of-town exchange included in the dial signal when said first operation signal detector detects the operation signal.

The first controller controls said first switching connection unit so as to connect said first telephone having sent the dial signal to said first out-of-town exchange corresponding to said out-of-town exchange number recognized by said first out-of-town exchange number recognizer when said first operation signal detector detects said operation signal, and to keep said communication channel without breaking the channel until satisfying said predetermined breaking condition even if said first telephone is on the hook.

Preferably, said first out-of-town exchange comprises a second switching connection unit for performing a switching connection between at least one of said first local exchange and said first out-of-town exchange and at least one of said second local exchange and said second out-of-town exchange, a second controller for controlling said second switching connection unit, a second operation signal detector for checking whether a dial signal having been transferred from at least one of said first local exchange and said first out-of-town exchange includes an operation signal, and a second out-of-town exchange number recognizer for recognizing an out-of-town exchange number included in the dial signal when said second operation signal detector detects the operation signal.

Preferably said second controller, when waiting to receive a new dial signal including a local exchange number and a subscriber phone number of a connecting destination, controls said second switching connection unit so as to connect said second local exchange corresponding to a local exchange number included in the new dial signal with at least one of said first local exchange and said first out-of-town exchange that is a sending source of the new dial signal when said second operation signal detector detects the operation signal and said out-of-town exchange number recognized by said second out-of-town exchange number recognizer is said out-of-town exchange number of the first out-of-town exchange, and to keep the communication channel without breaking the channel until satisfying said predetermined breaking condition even if said first telephone is on the hook.

Further, the second controller controls said second switching connection unit so as to connect said second out-of-town exchange corresponding to an out-of-town exchange number with at least one of said first local exchange and said first out-of-town exchange that is a sending source of the dial signal when said second operation signal detector detects the operation signal and said out-of-town exchange number recognized by said second out-of-town exchange number recognizer is an out-of-town exchange number other than the out-of-town exchange number of the first out-of-town exchange, and to keep the communication channel without breaking the communication channel until satisfying said predetermined breaking condition even if said first telephone is on the hook.

According to a preferred embodiment, the telephone exchange system comprises a first local exchange and a first out-of-town exchange, the first local exchange comprising a first switching connection unit for performing a switching connection between said first telephone and said first out-of-town exchange, a first controller for controlling said first switching connection unit, a first operation signal detector for checking whether a dial signal having been sent from said first telephone includes an operation signal, and a first out-of-town exchange number recognizer for recognizing an out-of-town exchange included in the dial signal when said first operation signal detector detects the operation signal, said first controller controlling said first switching connection unit so as to connect said first telephone having sent the dial signal to said first out-of-town exchange corresponding to said out-of-town exchange number recognized by said first out-of-town exchange number recognizer when said first operation signal detector detects the operation signal, and to keep the communication channel without breaking the channel until satisfying said predetermined breaking condition if said first telephone is on the hook.

The first out-of-town exchange comprises a second switching connection unit for performing a switching connection between at least one of said first local exchange and said first out-of-town exchange and one of said second local exchange and said second out-of-town exchange, a second controller for controlling said second switching connection unit, a second operation signal detector for checking whether a dial signal having been transferred from at least one of said first local exchange and said first out-of-town exchange includes an operation signal, and a second out-of-town exchange number recognizer for recognizing an out-of-town exchange number included in the dial signal when said second operation signal detector detects the operation signal.

The second controller, when waiting to receive a new dial signal including a local exchange number and a subscriber phone number of a connecting destination, controls said second switching connection unit so as to connect said second local exchange corresponding to a local exchange number included in the new dial signal with at least one of said first local exchange and said first out-of-town exchange that is a sending source of the new dial signal when said second operation signal detector detects the operation signal and said out-of-town exchange number recognized by said second out-of-town exchange number recognizer is said out-of-town exchange number of the first out-of-town exchange, and to keep the communication channel without breaking the channel until satisfying said predetermined breaking condition even if said first telephone is on the hook, and controlling said second switching connection [means] unit so as to connect said second out-of-town exchange corresponding to an out-of-town exchange number with at least one of said local exchange and said first out-of-town exchange that is a sending source of the dial signal when said second operation signal detector detects the operation signal and said out-of-town exchange number recognized by said second out-of-town exchange number recognizer is an out-of-town exchange number other than the out-of-town exchange number of the first out-of-town exchange, and to keep the communication channel without breaking the channel until satisfying said predetermined breaking condition even if said first telephone is on the hook.

Preferably, after said first telephone is on the hook, said first local exchange and first out-of-town exchange breaks the established communication channel if said first telephone is not off the hook until a predetermined hour has passed, or if off-hook and on-hook are successively performed during the predetermined hours.

According to a further aspect, the invention comprises a switching connection method for controlling a switching connection between telephones in a telephone exchange network having a plurality of out-of-town exchanges interconnected with each other, local exchanges connected to said out-of-town exchanges, and telephones connected to said local exchanges. The method comprises the steps of in a first local exchange, keeping a communication channel established between a first telephone connected to the first local exchange and a first out-of-town exchange associated with the first local exchange without breaking the communication channel until satisfying a predetermined breaking condition even if said first telephone is on the hook, when a connection has been established between said first out-of-town exchange and said first telephone the call, in reply to a call under a predetermined condition.

Further, the method comprises, in said first out-of-town exchange, keeping a communication channel established between at least one of said first local exchange and said first out-of-town exchange, and at least one of a second out-of-town exchange and the a second local exchange without breaking the communication channel until satisfying said predetermined breaking condition even if said first telephone is on the hook, when, in reply to a call under said predetermined condition, the connection has been established between at least one of said first local exchange and said first out-of-town exchange of a sending party of the call and at least one of said second out-of-town exchange and said second local exchange of a sending destination of the call.

Preferably, the method further comprises, in said first local exchange, receiving a dial signal sent from said first telephone; checking whether the received dial signal includes an operation signal; recognizing an out-of-town exchange number included in the dial signal when detecting the operation signal; connecting said first out-of-town exchange corresponding to the recognized out-of-town exchange number with said first telephone having issued the dial signal when detecting the operation signal; and keeping the communication channel without breaking the channel until satisfying said predetermined breaking condition even if said first telephone is on the hook, after the above connection when detecting the operation signal.

Preferably, the method further comprises, in said first out-of-town exchange, receiving a dial signal transferred from at least one of said first local exchange and said second out-of-town exchange; checking whether the received dial signal includes an operation signal; recognizing an out-of-town exchange number included in the dial signal when detecting the operation signal; when waiting to receive a new dial signal including a local exchange number and a subscriber phone number of a connecting destination, connecting said second local exchange corresponding to said local exchange number included in the new dial signal with at least one of said first local exchange and said first out-of-town exchange that is a sending source of the new dial signal, when detecting the operation signal and when the recognized out-of-town exchange number is the out-of-town exchange number of the first out-of-town exchange; connecting said second out-of-town exchange corresponding to said out-of-town exchange number with at least one of said first local exchange and said first out-of-town exchange that is a sending source of the dial signal when detecting the operation signal and when the recognized out-of-town exchange number is [said] an out-of-town exchange number other than the out-of-town exchange number of the first out-of-town exchange; and keeping the communication channel without breaking the channel until satisfying said predetermined breaking condition even if said first telephone is on the hook, after the connection when detecting the operation signal.

According to another aspect, the invention comprises a method comprising the steps of, in said first local exchange, receiving a dial signal sent from said first telephone; checking whether the received dial signal includes an operation signal; recognizing a out-of-town exchange number included in the dial signal when detecting the operation signal; connecting said first out-of-town exchange corresponding to the recognized out-of-town exchange number with said first telephone having issued the dial signal when detecting the operation signal; and keeping the communication channel without breaking the communication channel until satisfying said predetermined breaking condition even if said first telephone is on the hook, after the above connection when detecting the operation signal, while in said first out-of-town exchange, receiving a dial signal transferred from at least one of said first local exchange and said second out-of-town exchange; checking whether the received dial signal includes an operation signal; recognizing an out-of-town exchange number included in the dial signal when detecting the operation signal; when waiting to receive a new dial signal including a local exchange number and a subscriber phone number of a connecting destination, connecting said second local exchange corresponding said local exchange number included in the new dial signal at least one of said first local exchange and said first out-of-town exchange that is a sending source of the new dial signal, when detecting the operation signal and when the recognized out-of-town exchange number is the out-of-town exchange number of the first out-of-town-exchange; connecting said second out-of-town exchange corresponding to said out-of-town exchange number with at least one of said first local exchange and said first out-of-town exchange that is a sending source of the dial signal when detecting the operation signal and when the recognized out-of-town exchange number is an out-of-town exchange number other than the out-of-town exchange number of the first out-of-town exchange; and keeping the communication channel without breaking the channel until satisfying said predetermined breaking condition even if said first telephone is on the hook, after the connection when detecting the operation signal.

Preferably, the method further comprises a step of breaking the established communication channel if said first telephone is not off the hook until a predetermined hour has passed, or if off-hook and on-hook are successively performed during the predetermined hour, after said first telephone was on the hook, in said first local exchange and said first out-of-town exchange.

According to another aspect, the invention comprises a computer readable memory storing a computer program for controlling a switching connection between telephones by use of an out-of-town exchange and a local exchange, in a telephone exchange network having a plurality of out-of-town exchanges interconnected with each other, local exchanges connected to said out-of-town exchanges, and telephone connected to said local exchanges, the computer program executing the steps of: by the computer program in a first local exchange, keeping a communication channel established between a first telephone connected to the first local exchange and a first out-of-town exchange associated with the first local exchange without breaking the communication channel until satisfying a predetermined breaking condition even if said first telephone is on the hook, when the connection has been established between said first out-of-town exchange and said first telephone having issued the call, in reply to a call under a predetermined condition; and by the computer program in said first out-of-town exchange, keeping a communication channel established between at least one of said first local exchange and said first out-of-town exchange and at least one of a second out-of-town exchange a second local exchange associated with the second out-of-town exchange without breaking the communication channel until satisfying said predetermined breaking condition even if said first telephone is on the hook, when, in reply to a call under said predetermined condition, the connection has been established between at least one of said first local change and said first out-of-town exchange of a sending party of the call and one of said second out-of-town exchange and the second local exchange of a sending destination of the call.

Preferably, the computer program in said first local exchange executes the steps of: receiving a dial signal sent from said first telephone; checking whether the received dial signal includes an operation signal; recognizing an out-of-town exchange number included in the dial signal when detecting the operation signal; connecting said first out-of-town exchange corresponding to the recognized out-of-town exchange corresponding to the recognized out-of-town exchange number with said first telephone having issued the dial signal when detecting the operation signal; and keeping the communication channel without breaking the communication channel until satisfying said predetermined breaking condition even if said first telephone is on the hook, after the above connection when detecting the operation signal.

Preferably, the computer program in said first out-of-town exchange executes the steps of; receiving a dial signal transferred from at least one of said first local exchange and said second out-of-town exchange; checking whether the received dial signal includes an operation signal; recognizing an out-of-town exchange number included in the dial signal when detecting the operation signal; when waiting to receive a new dial signal including a local exchange number and a subscriber phone number of a connecting destination, connecting said second local exchange corresponding to said local exchange number included in the new dial signal with at least one of said first local exchange and said first out-of-town exchange that is a sending source of the new dial signal, when detecting the operation signal and when the recognized out-of-town exchange number is said out-of-town exchange number of the first out-of-town exchange; connecting said second out-of-town exchange corresponding to said out-of-town exchange number with at least one of said first local exchange and said first out-of-town exchange that is a sending source of the dial signal when detecting the operation signal and when the recognized out-of-town exchange number is an out-of-town exchange number other than the out-of-town exchange number of the first out-of-town exchange; and keeping the communication channel without breaking the channel until satisfying said predetermined breaking condition even if said first telephone is on the hook, after the connection when detecting the operation signal.

According to a preferred embodiment, the computer program in said first local exchange executes the steps of: receiving a dial signal sent from said first telephone; checking whether the received dial signal includes an operation signal; recognizing an out-of-town exchange number included in the dial signal when detecting the operation signal; connection said first out-of-town exchange corresponding to the recognized out-of-town exchange number with said first telephone having issued the dial signal when detecting the operation signal; and keeping the communication channel without breaking the communication channel until satisfying said predetermined breaking condition even if said first telephone is on the hook, after the above connection when detecting the operation signal, while the computer program in said first out-of-town exchange executes the steps of: receiving a dial signal transferred from one of said first local exchange and said second out-of-town exchange; checking whether the received dial signal includes an operation signal; recognizing an out-of-town exchange number included in the dial signal when detecting the operation signal; when waiting to receive a new dial signal including a local exchange number and a subscriber phone number of a connecting destination, connecting said second local exchange corresponding to the local exchange number included in the new dial signal with at least one of said first local exchange and said first out-of-town exchange that is a sending source of the new dial signal, when detecting the operation signal and when the recognized out-of-town exchange number is the out-of-town exchange number of the first out-of-town exchange; connecting said second out-of-town exchange corresponding to the out-of-town exchange number with at least one of said first local exchange and said first out-of-town exchange that is a sending source of the dial signal when detecting the operation signal and when the recognized out-of-town exchange number is the out-of-town exchange number other than the out-of-town exchange number of the first out-of-town exchange; and keeping the communication channel without breaking the channel until satisfying said predetermined breaking condition even if said first telephone is on the hook, after the connection when detecting the operation signal.

According to a preferred embodiment, the computer program in said first local exchange and said first out-of-town exchange breaks the established communication channel if said first telephone is not off the hook until a predetermined hour has passed, or if off-hook and on-hook are successively performed during the predetermined hour, after said telephone was once on the hook, in the first local exchange and said first out-of-town exchange.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 1 is a block diagram showing the structure of a telephone exchange system according to an embodiment of the present invention;

FIG. 2 is a view for use in describing the operation of the embodiment;

FIG. 7 a block diagram showing the structure of the conventional telephone exchange system;

DESCRIPTION OF THE PREFERRED EMBODIMENT

Figure 3:
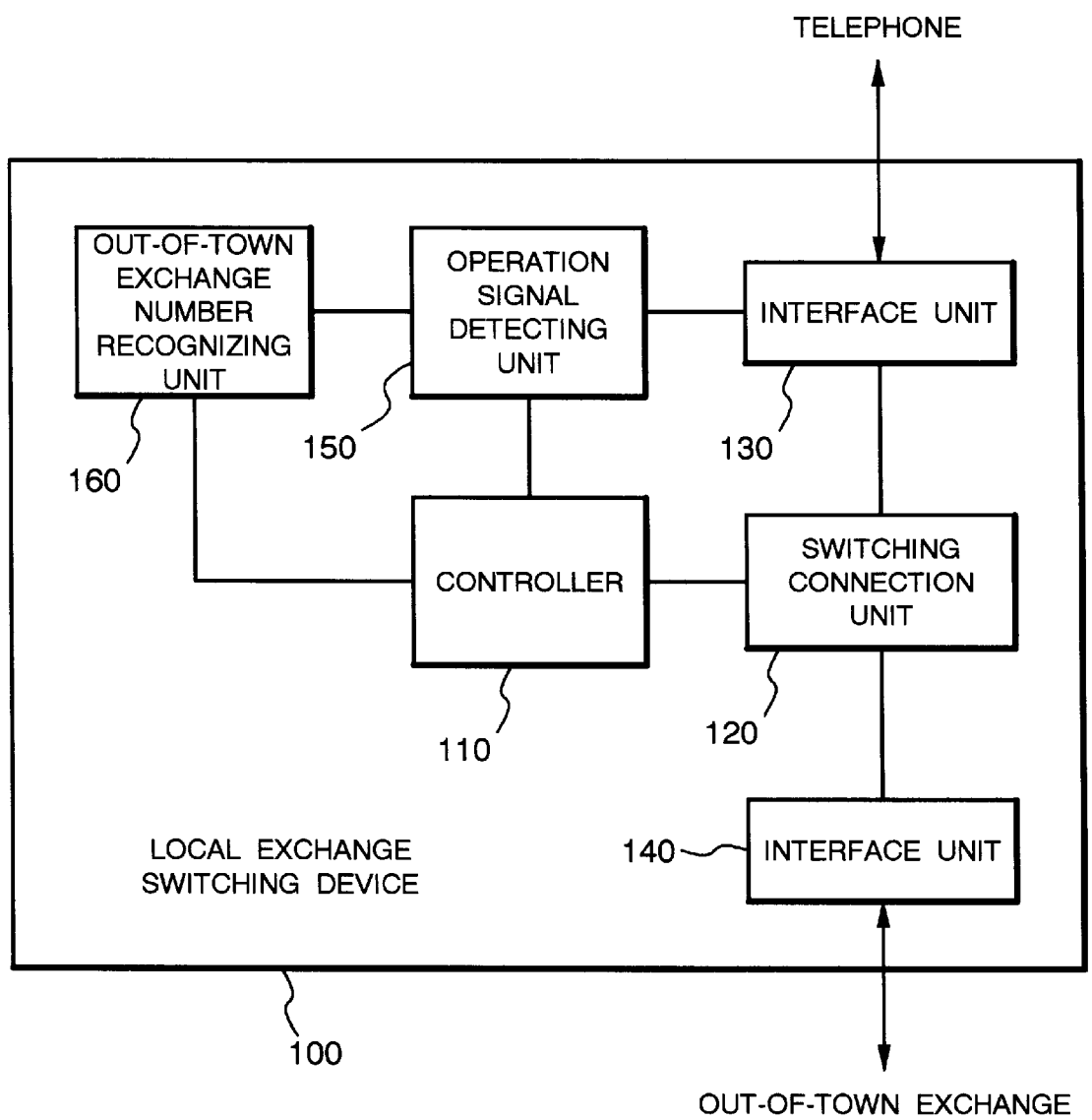
FIG. 3 is a block diagram showing the structure of a local exchange in the embodiment.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscuring the present invention.

FIG. 1 is a block diagram showing the structure of a telephone exchange system according to an embodiment of the present invention. The embodiment is realized on an ordinary telephone line. The example shown in FIG. 1 comprises telephones 11, 13, 14, and 15 respectively used by subscribers (A), (B), (C), and (D), local exchanges 12, 16, 17, and 18, and out-of-town exchanges 19 and 20. As illustrated in FIG. 1, the telephone 11 belonging to the subscriber (A) is accommodated in the local exchange 12, the telephone 13 belonging to the subscriber (B) is accommodated in the local exchange 16, the telephone 14 belonging to the subscriber (C) is accommodated in the local exchange 17, and the telephone 15 belonging to the subscriber (D) is accommodated in the local exchange 18. The local exchange 12 is connected to the out-of-town exchange 19, the local exchanges 16, 17, and 18 are connected to the out-of-town exchange 20, and further the out-of-town exchange 19 and the out-of-town exchange 20 are connected with each other.

The following description will be made in the case where the subscriber (A) belonging to a predetermined out-of-town exchange makes a call successively to the subscribers (B), (C), and (D) belonging to another out-of-town exchange. The local exchanges 12, 16, 17, and 18 and the out-of-town exchanges 19 and 20 are respectively provided with an electronic switching device, that is a switching device of stored program method, performing a switching connection by the control of the stored program. Usually, many telephones are connected to each local exchange. A plurality of local exchanges are connected to each out-of-town exchange. Further, another several out-of-town exchanges are connected to each out-of-town exchange. In the case of FIG. 1, some out-of-town exchanges may intervene between the out-of-town exchanges 19 and 20. In such a case, these out-of-town exchanges fundamentally perform the same operation as the out-of-town exchange 19.

FIG. 2 shows the operation of the embodiment when the telephone 11 belonging to the subscriber (A) performs each call connection to the telephones 13, 14, and 15 belonging to the respective subscribers (B), (C), and (D).

When the telephone 11 is off the hook by the subscriber (A), the local exchange 12 detects the off-hook of the telephone 11 and sends a first dial tone (DT) to the telephone 11.

After confirmation of the first dial tone through the telephone 11, the subscriber (A) dials the out-of-town exchange number of the telephone 13 and a given operation signal. The operation signal means a signal instructing an exchange to execute a proper switching control in the embodiment. The operation signal may include, for example, dial signals such as "*" or "#". Instead of "*" or "#", numerical combination can be used. However, the use of "*" or "#" is preferable, because the times of pushing the dial button can be reduced more than in case of using the numerical combination. Assume that the mark "*" is used as the operation signal here. Therefore, the dial operation results in "out-of-town exchange number +*".

The local exchange 12 recognizes the dial signal "out-of-town exchange number +*" sent from the telephone 11 as a normal dial signal and transfers the dial signal "out-of-town exchange number +*" to the out-of-town exchange 19. The local exchange 12 forms a communication channel between the telephone 11 and the out-of-town exchange 19.

The out-of-town exchange 19 recognizes the dial signal "out-of-town exchange number +*" transferred from the local exchange 12 as the normal dial signal and transfers the same dial signal to the out-of-town exchange 20 corresponding to the out-of-town exchange number included in the same dial signal. The out-of-town exchange 19 forms a communication channel between the local exchange 12 and the out-of-town exchange 20.

In the above way, a call connection from the telephone 11 to the out-of-town exchange 20 can be established.

If the out-of-town exchange 20 judges that the out-of-town exchange number included in the received dial signal "out-of-town exchange number +*" is destined to itself, it transmits a second dial tone (2ndDT) to the telephone 11. The second dial tone is transferred to the telephone 11 via the out-of-town exchange 19 and the local exchange 12.

After confirmation of the second dial tone through the telephone 11, the subscriber (A) dials the local exchange number and the subscriber phone number of the telephone 13 owned by the subscriber (B) and the confirmation signal "*". The dial signal "local exchange number+subscriber phone number+*" is sent to the out-of-town exchange 20 through the local exchange 12 and the out-of-town exchange 19. The confirmation signal "*" is a signal for clearing its correspondence to the dial signal "out-of-town exchange number+*" having been sent last. Therefore, only "local exchange number+subscriber phone number" may be sent instead of sending the confirmation signal "*".

Upon receipt of the dial signal "local exchange number+ subscriber phone number+*", the out-of-town exchange 20 sends the same dial signal "local exchange number+ subscriber phone number" to the local exchange 16 corresponding to the local exchange number included in the same dial signal.

The local exchange 16 sends a call signal to the telephone 13 corresponding to the subscriber phone number of the received dial signal and sends a call tone to the out-of-town exchange 20 having sent the dial signal. The call tone having been sent to the out-of-town exchange 20 is transmitted from the out-of-town exchange 20 to the telephone 11 through the out-of-town exchange 19 and the local exchange 12.

Thereafter, if the telephone 13 is off the hook, communication between the telephone 11 and the telephone 13 becomes possible. Thus, a call connection ② from the out-of-town exchange 20 to the telephone 13, as shown in FIG. 1, can be realized.

When the subscriber (A) puts the telephone 11 on the hook, the local exchange 12 detects the on-hook of the telephone 11 and notifies the out-of-town exchange 19 of the on-hook. At this time, the local exchange 12 keeps the call connection ① without performing any break and restoration processing of the communication channel until a predetermined hour has passed. When a predetermined hour has passed without detecting the off-hook of the telephone 11, or when the off-hook and the on-hook are successively detected within a predetermined hour, the break and restoration processing of a communication channel is performed.

The out-of-town exchange 19 operates similarly to the local exchange 12. Namely, upon receipt of a notice from the local exchange 12, the out-of-town exchange 19 notifies the out-of-town exchange 20 of the on-hook of the telephone 11. At this time, the out-of-town exchange 19 keeps the call connection ① without performing any break and restoration processing of a communication channel until a predetermined hour has passed. When a predetermined hour has passed without detecting off-hook of the telephone 11, or when off-hook and on-hook are successively detected within a predetermined hour, the break and restoration processing of a communication channel is performed.

Upon receipt of the notice of the off-hook of the telephone 11 from the out-of-town exchange 19, the out-of-town exchange 20 notifies the local exchange 16 of the off-hook and breaks the communication channel (call connection ②). However, while keeping a link to the out-of-town exchange 19 on the side of the telephone 11, the second dial tone is transmitted to the telephone 11.

Upon receipt of the notice of the off-hook of the telephone 11 from the out-of-town exchange 20, the local exchange 16 breaks the communication channel (call connection ②) and performs the restoration processing.

The subscriber (A) confirms that the second dial tone has been sent to the telephone 11 from the out-of-town exchange 20, and thereafter dials the local exchange number and the subscriber phone number of the telephone 14 owned by the subscriber (C) and the confirmation signal "*". The dial signal "local exchange number+subscriber phone number+*" is sent to the out-of-town exchange 20 through the local exchange 12 and the out-of-town exchange 19. The out-of-town exchange 20 sends the received dial signal "local exchange number+subscriber phone number+*" to the local exchange 17 corresponding to the local exchange number included in the same dial signal, in the same way as the above.

The local exchange 17 sends a call signal to the telephone 14 corresponding to the subscriber phone number of the received dial signal, in the same way as the local exchange 16 in case of the call connection ② and transmits a call tone to the telephone 11 through the out-of-town exchange 20, the out-of-town exchange 19, and the local exchange 12.

Thereafter, if the telephone 14 is off the hook, communication between the telephones 11 and 14 becomes possible, and a call connection ③ shown in FIG. 3 can be realized.

When the telephone 11 is on the hook by the subscriber (A), the local exchange 12 detects the on-hook of the telephone 11 and notifies the out-of-town exchange 19 of the on-hook. As mentioned above, the local exchange 12 and the out-of-town exchange 19 keep the call connection ① without performing any break and restoration processing of the communication channel until a predetermined hour has passed.

Upon receipt of the notice of the off-hook of the telephone 11 from the out-of-town exchange 19, the out-of-town exchange 20 notifies the local exchange 17 of the off-hook, breaks the communication channel (call connection ③) and transmits the second dial tone to the telephone 11.

Upon receipt of the notice of the off-hook of the telephone 11 from the out-of-town exchange 20, the local exchange 17 breaks the communication channel (call connection ③) and performs the restoration processing.

After confirming that the second dial tone has been sent to the telephone 11 from the out-of-town exchange 20, the subscriber (A) dials the local exchange number and the subscriber phone number of the telephone 15 owned by the subscriber (D) and the confirmation signal "*". Thereafter, a call connection ④ shown in FIG. 1 can be established in the same procedure as in case of the above-mentioned call connection ② and call connection ③.

If the telephone 11 is not on the hook within a predetermined hour after the off hook, the local exchange 12 breaks the communication channel (call connection ①) to do the ring-off processing and sends the notice of the off-hook to the out-of-town exchange 19 again. The out-of-town exchanges 19 and 20 having received the notice break the respective communication channels (call connection ①) to do the ring-off processing. If the telephone 11 is on the hook and immediately off the hook within a predetermined hour, after the telephone 11 is off the hook, the local exchange 12, the out-of-town exchanges 19 and 20 similarly break the respective communication channels (call connection ①) to do the ring-off processing.

FIG. 3 is a block diagram showing an example of the structure of a switching device for use in the local exchange of the embodiment. With reference to FIG. 3, the local exchange switching device 100 comprises a controller 110, a switching connection unit 120 for performing a switching connection between a telephone and an out-of-town exchange by the control of the controller 110, interface units 130 and 140, an operation signal detecting unit 150, upon receipt of a dial signal from a telephone, for checking whether the dial signal includes an operation signal or not, an out-of-town exchange number recognizing unit 160 for recognizing the out-of-town exchange number included in the same dial signal when the operation signal detecting unit 150 detects an operation signal within a dial signal. FIG. 3 shows only the characteristic components of the embodiment and the description of the other general components is omitted there.

Of the above components, the controller 110, the operation signal detecting unit 150, and the out-of-town exchange number recognizing unit 160 may be realized by, for example, a microcomputer controlled by a program. The computer program for controlling the microcomputer is provided, stored in a general storing means such as a magnetic disk, an optical disk, a semiconductor memory, or the like, and it is loaded in a data processing unit of the microcomputer to execute each of the above-mentioned functions.

Figure 5:
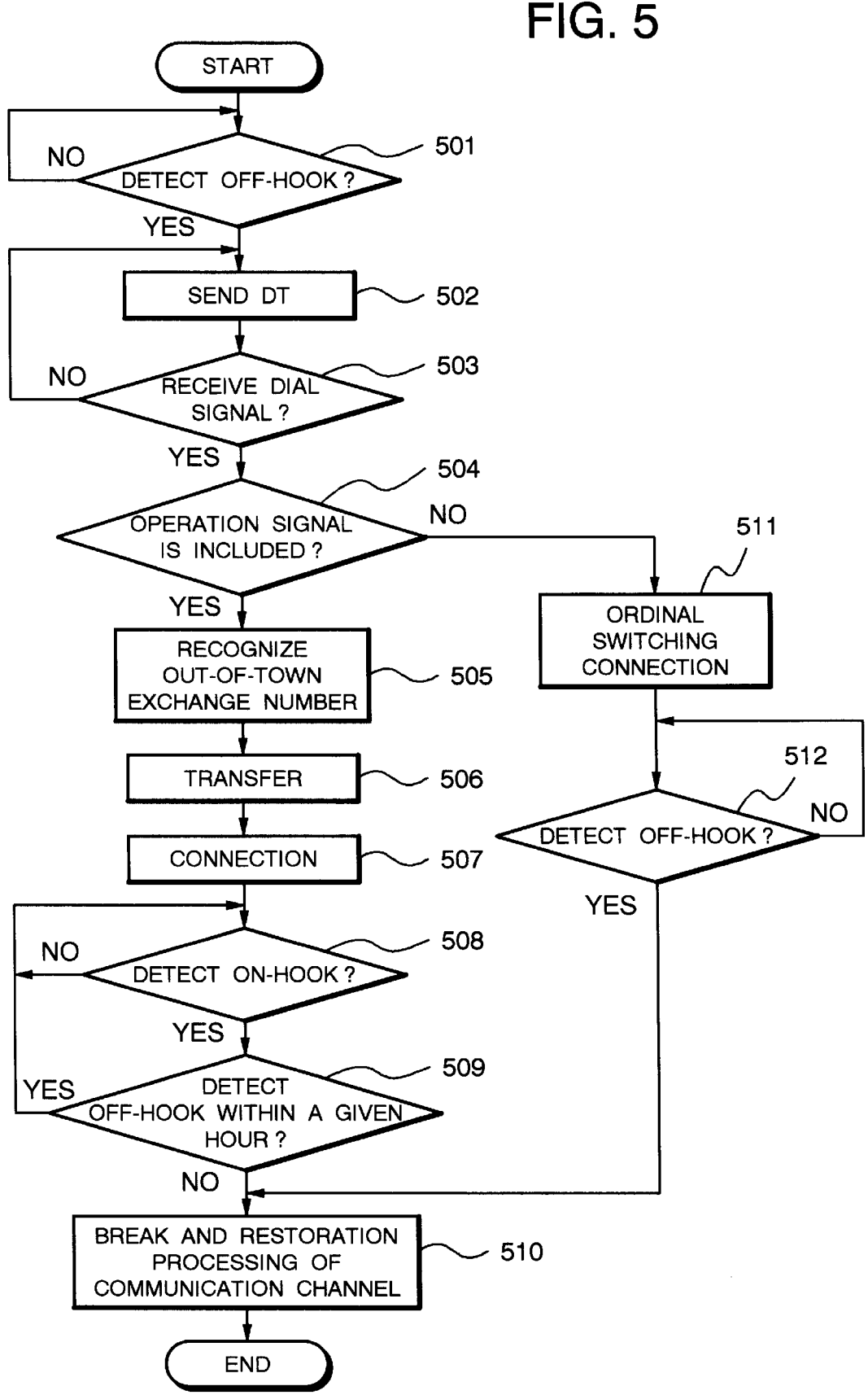
FIG. 5 is a flow chart showing the operation of a controller of a switching device for use in a local exchange in the embodiment.

FIG. 5 is a flow chart showing the operation of the controller 110 of the switching device 100 for use in the local exchange of the embodiment.

The controller 110 of the local exchange switching device 100 transmits the first dial tone (DT) to the telephone being off the hook (Step 502) when detecting the off-hook of a telephone connected to the own exchange (Step 501). Upon receipt of a dial signal (Step 503), the operation signal detecting unit 150 judges whether the dial signal includes an operation signal (for example, "*") or not (Step 504).

When it is judged that the dial signal includes an operation signal in Step 504, the out-of-town exchange number recognizing unit 160 recognizes the out-of-town exchange number included in the dial signal (Step 505), and the dial signal is transferred to the out-of-town exchange corresponding to the obtained out-of-town exchange number (Step 506). Then, a communication channel is established between the telephone having sent the dial signal and the out-of-town exchange of the transfer destination of the dial signal (Step 507). Under this condition, the second dial tone or the dial signal can be exchanged between the telephone having sent the dial signal and the out-of-town exchange of the transfer destination of the dial signal.

The controller 110 starts a timer upon detecting the on-hook of the telephone on which the communication channel has been set (Step 508). When detecting the off-hook of the telephone by the time a predetermined hour has passed, the step will return to Step 508 (Step 509). When the off-hook of the telephone is not detected by the time a predetermined hour has passed, the communication channel between the telephone and the out-of-town exchange is broken and the restoration processing is performed (Steps 509 and 510).

When detecting no operation signal in Step 504, the controller 110 performs the ordinary switching processing, that is the switching connection processing based on the received out-of-town exchange number, local exchange number and subscriber phone number (Step 511). When detecting the off-hook of a telephone, the communication channel is broken and the restoration processing is performed (Steps 512 and 510).

When the local exchange is in a position of a receiving party, since its operation is completely similar to the conventional operation, the description will be omitted.

Figure 4:
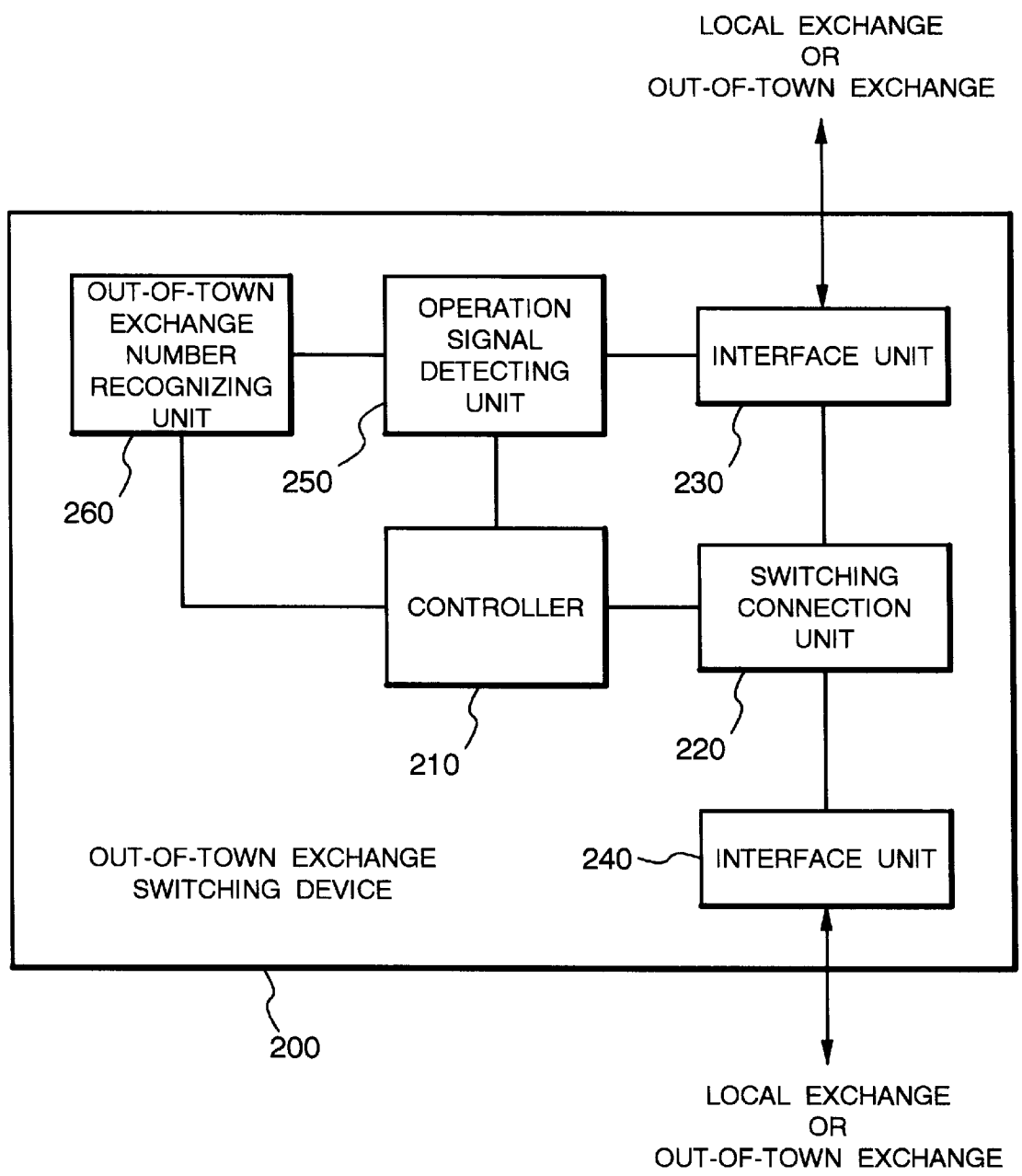
FIG. 4 is a block diagram showing the structure of an out-of-town exchange in the embodiment.

FIG. 4 is a block diagram showing an example of the structure of a switching device for use in the out-of-town exchange of the embodiment. With reference to FIG. 4, a local exchange switching device 200 comprises a controller 210, a switching connection unit 220 for performing a switching connection between a telephone and an out-of-town exchange by the control of the controller 210, interface units 230 and 240, an operation signal detecting unit 250, upon receipt of a dial signal from a telephone, for checking whether the same dial signal includes an operation signal or not, and an out-of-town exchange number recognizing unit 260 for recognizing the out-of-town exchange number included in the same dial signal when the operation signal detecting unit 250 detects an operation signal within a dial signal. FIG. 4 shows only the characteristic components of the embodiment and the description of the other general components is omitted there.

Of the above components, the controller 210, the operation signal detecting unit 250, and the out-of-town exchange number recognizing unit 260 may be realized by, for example, a microcomputer controlled by a program. The computer program for controlling the microcomputer is provided, stored in a general storing means such as a magnetic disk, an optical disk, a semiconductor memory, or the like, and it is loaded in a data processing unit of the microcomputer to execute each of the above-mentioned functions.

Figure 6:
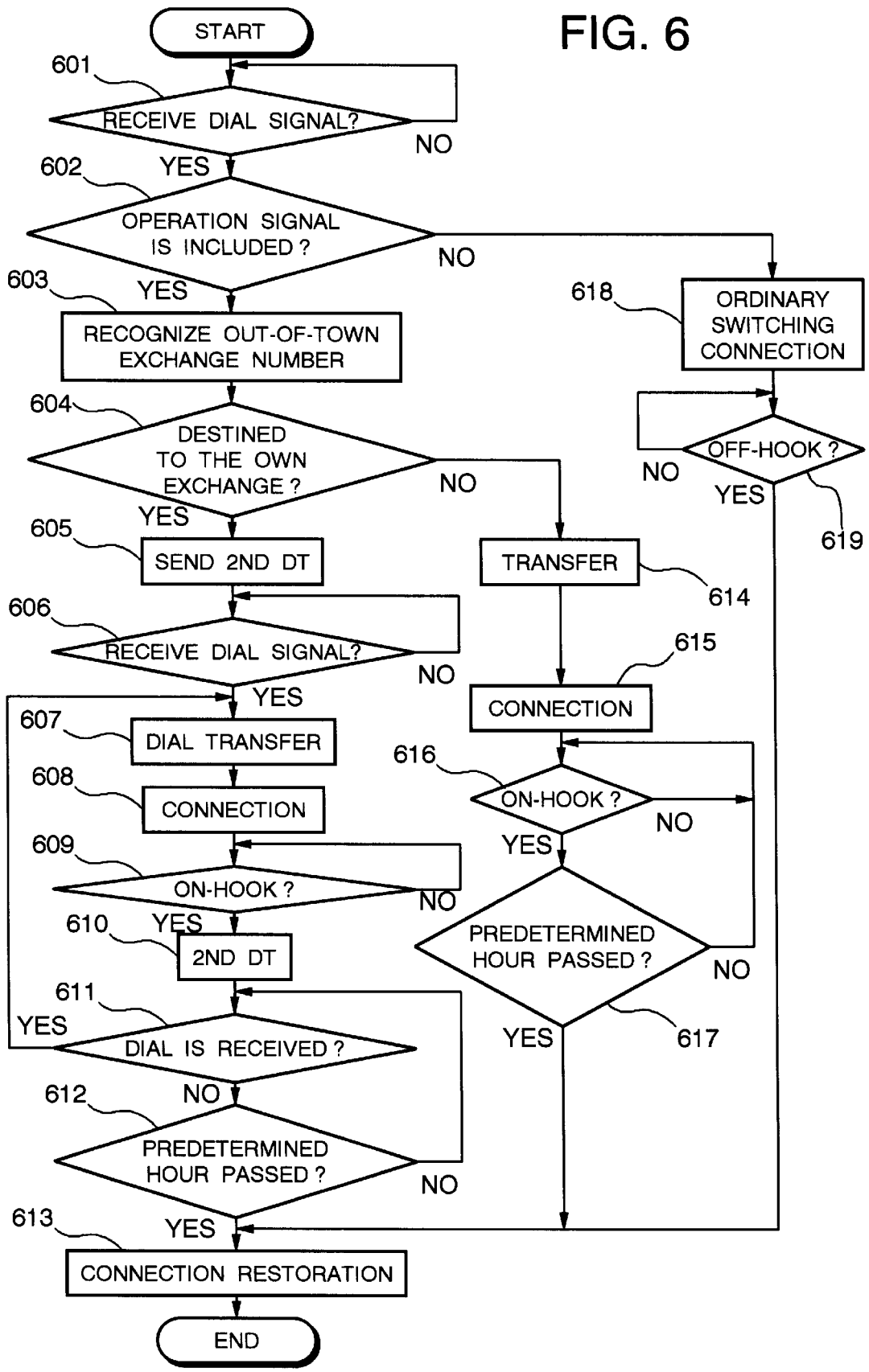
FIG. 6 is a flow chart showing the operation of a controller of a switching device for use in an out-of-town exchange in the embodiment.
Figure 8B:
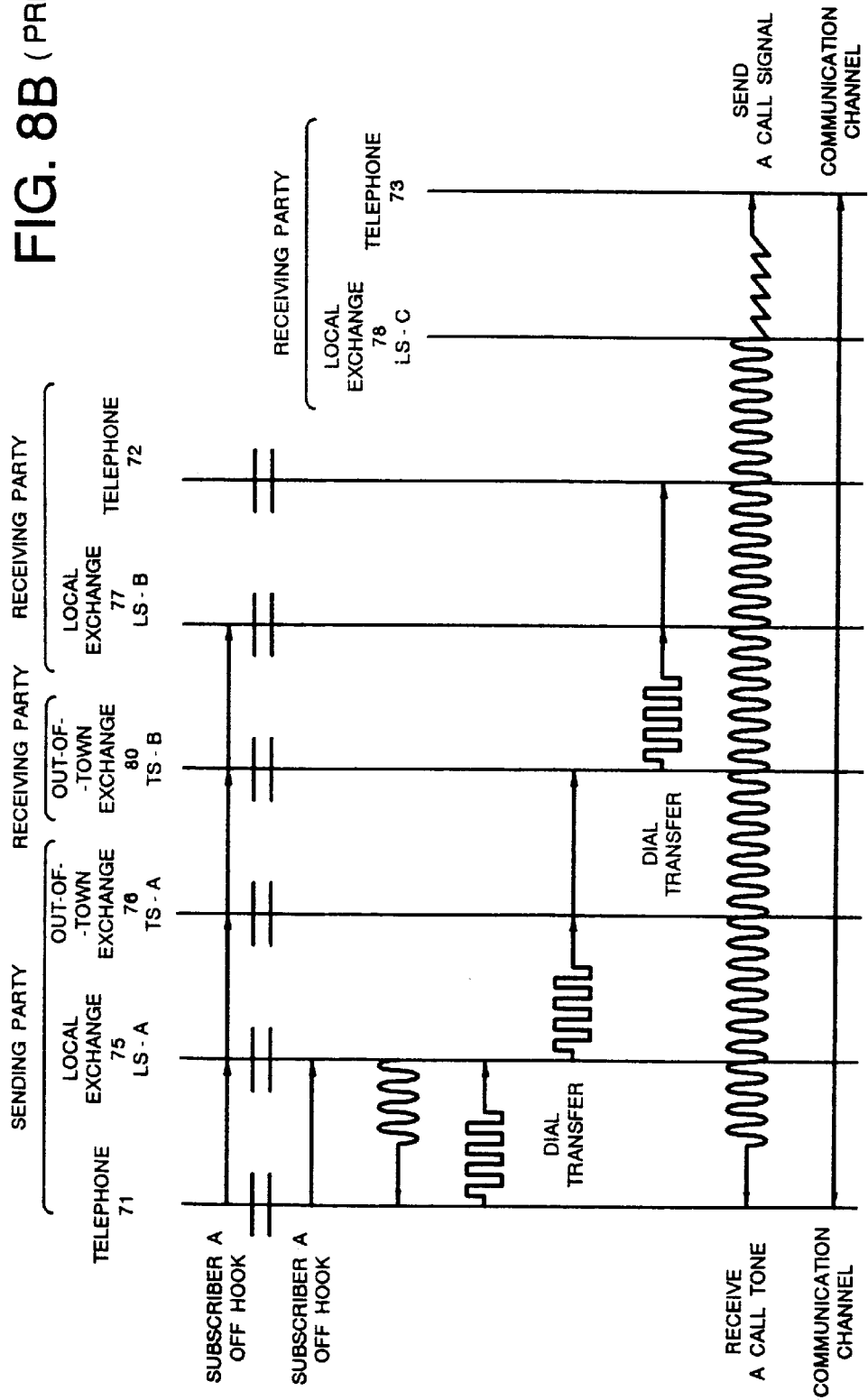
FIG. 8 is a view for use in describing the operation of the conventional telephone exchange system.

FIG. 6 is a flow chart showing the operation of the controller 210 of the switching device 200 for use in the local exchange of the embodiment.

When the controller 210 of the out-of-town exchange switching device 200 receives a dial signal transferred from a local exchange (Step 601), the operation signal detecting unit 250 judges whether the same dial signal includes an operation signal or not (Step 602). When the received dial signal includes an operation signal, the out-of-town exchange recognizing unit 260 recognizes the out-of-town exchange number included in the same dial signal (Step 603) and judges whether the out-of-town exchange number is destined to itself or the local exchange (Step 604).

When it is judged that the received dial signal is destined to the own exchange in Step 604, the second dial tone is transmitted to the telephone having issued the dial signal (Step 605). Upon receipt of a new dial signal (Step 606), the dial signal is transferred to the local exchange corresponding to the local exchange number included in the dial signal (Step 607), and a communication channel is established between the out-of-town exchange on the side of the sending party and the local exchange on the side of the receiving party (step 608).

Thereafter, if there is a notice of on-hook on the side of a telephone, the second dial tone is delivered again (Steps 609 and 610). When a new dial signal is received within a predetermined hour, the step will return to Step 607 (Steps 611 and 612). While, if any new dial signal has not been received when a predetermined hour has passed, or if off-hook and on-hook are successively notified within a predetermined hour, the communication channel between the out-of-town exchange and the local exchange is broken, to do the ring-off processing (Steps 612 and 613).

When it is judged that the received dial signal is destined to the other exchange in Step 604, the controller 210 transfers the dial signal to the out-of-town exchange of the destination party (Step 614), and a communication channel is established between the local exchange on the sending side or the out-of-town exchange on the side of the sending party and the out-of-town exchange on the side of the receiving party (Step 615).

Upon receipt of the notice of the on-hook, when a given hour has further passed, or when on-hook and off-hook are successively performed within the given hour (Steps 616 and 617), the communication channel is broken, to do the ring-off processing (Step 613).

When the dial signal includes no operation signal in Step 602, the ordinal connecting processing is performed (Step 618). If detecting the off-hook of a telephone, the communication channel is broken, to do the ring-off processing (Steps 619 and 613).

As set forth hereinabove, according to the telephone exchange system and switching connection method of the present invention, when successively making a call to a plurality of telephones connected to an identical out-of-town exchange from a telephone connected to another out-oftown exchange, a connection to an out-of-town exchange on the receiving side which has been established at the first call, is kept for a given hour without being broken after the on-hook of the telephone on the calling party, thereby shortening the time required for the same connection in the second calling or the later.

Since there is no necessity of dialing the out-of-town exchange number again in the second calling or the later, the present invention is able to make the dial operation easy.

These effects are more remarkable according as the number of connecting parties increases.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A telephone exchange system for controlling a switching connection between telephones, having a plurality of out-of-town exchanges interconnected with each other, local exchanges connected to said out-of-town exchanges, and telephones connected to said local exchanges, wherein
    when a connection has been established between a first out-of-town exchange and a first telephone having issued a call, in reply to a call under a predetermined condition, the first telephone being associated with a first local exchange, said first local exchange keeps a communication channel established between said first telephone and said first out-of-town exchange without braking the communication channel until satisfying a predetermined breaking condition even if said first telephone is on the hook, while
    when, in reply to a call under said predetermined condition, a connection has been established between at least one of said first local exchange and said first out-of-town exchange of a sending party of the call and at least one of a second out-of-town exchange and a second local exchange of a sending destination of the call, the second local exchange being associated with a second telephone, said first out-of-town exchange keeps a communication channel established between at least one of said first local exchange and said first out-of-town exchange and at least one of said second out-of-town exchange and said second local exchange without breaking the communication channel until satisfying said predetermined breaking condition even if said first telephone is on the hook.

2. A telephone exchange system as set forth in claim 1, wherein
    said first local exchange comprises:
    a first switching connection unit for performing a switching connection between said first telephone and said first out-of-town exchange,
    a first controller for controlling said first switching connection unit,
    a first operation signal detector for checking whether a dial signal having been sent from said first telephone includes an operation signal, and
    a first out-of-town exchange number recognizer for recognizing an out-of-town exchange included in the dial signal when said first operation signal detector detects the operation signal,
    said first controller
    controlling said first switching connection unit so as to connect said first telephone having sent the dial signal to said first out-of-town exchange corresponding to said out-of-town exchange number recognized by said first out-of-town exchange number recognizer when said first operation signal detector detects said operation signal, and to keep said communication channel without breaking the channel until satisfying said predetermined breaking condition even if said first telephone is on the hook.

3. A telephone exchange system as set forth in claim 1, wherein
    said first out-of-town exchange comprises
    a second switching connection unit for performing a switching connection between at least one of said first local exchange and said first out-of-town exchange and at least one of said second local exchange and said second out-of-town exchange,
    a second controller for controlling said second switching connection unit,
    a second operation signal detector for checking whether a dial signal having been transferred from at least one of said first local exchange and said first out-of-town exchange includes an operation signal, and
    a second out-of-town exchange number recognizer for recognizing an out-of-town exchange number included in the dial signal when said second operation signal detector detects the operation signal,
    said second controller,
    when waiting to receive a new dial signal including a local exchange number and a subscriber phone number of a connecting destination, controlling said second switching connection unit so as to connect said second local exchange corresponding to a local exchange number included in the new dial signal with at least one of said first local exchange and said first out-of-town exchange that is a sending source of the new dial signal when said second operation signal detector detects the operation signal and said out-of-town exchange number recognized by said second out-of-town exchange number recognizer is said out-of-town exchange number of the first out-of-town exchange, and to keep the communication channel without breaking the channel until satisfying said predetermined breaking condition even if said first telephone is on the hook, and
    controlling said second switching connection unit so as to connect said second out-of-town exchange corresponding to an out-of-town exchange number with at least one of said first local exchange and said first out-of-town exchange that is a sending source of the dial signal when said second operation signal detector detects the operation signal and said out-of-town exchange number recognized by said second out-of-town exchange number recognizer is an out-of-town exchange number other than the out-of-town exchange number of the first out-of-town exchange, and to keep the communication channel without breaking the communication channel until satisfying said predetermined breaking condition even if said first telephone is on the hook.

4. A telephone exchange system as set forth in claim 1, wherein said first local exchange comprises a first switching connection unit for performing a switching connection between said first telephone and said first out-of-town exchange, a first controller for controlling said first switching connection unit, a first operation signal detector for checking whether a dial signal having been sent from said first telephone includes an operation signal, and a first out-of-town exchange number recognizer for recognizing an out-of-town exchange included in the dial signal when said first operation signal detector detects the operation signal, said first controller controlling said first switching connection unit so as to connect said first telephone having sent the dial signal to said first out-of-town exchange corresponding to said out-of-town exchange number recognized by said first out-of-town exchange number recognizer when said first operation signal detector detects the operation signal, and to keep the communication channel without breaking the channel until satisfying said predetermined breaking condition even if said first telephone is on the hook, said first out-of-town exchange comprising a second switching connection unit for performing a switching connection between at least one of said first local exchange and said first out-of-town exchange and at least one of said second local exchange and said second out-of-town exchange, a second controller for controlling said second switching connection unit, a second operation signal detector for checking whether a dial signal having been transferred from at least one of said first local exchange and said first out-of-town exchange includes an operation signal, and a second out-of-town exchange number recognizer for recognizing an out-of-town exchange number included in the dial signal when said second operation signal detector detects the operation signal, said second controller, controlling said second switching connection unit so as to connect said second local exchange corresponding to a local exchange number included in the new dial signal with at least one of said first local exchange and said first out-of-town exchange that is a sending source of the new dial signal in time of the reception of a new dial signal including a local exchange number and a subscriber shone number of a connecting destination when said second operation signal detector detects the operation signal and said out-of-town exchange number recognized by said second out-of-town exchange number recognizer is said out-of-town exchange number of the first out-of-town exchange, and to keep the communication channel without breaking the channel until satisfying said predetermined breaking condition even if said first telephone is on the hook, and controlling said second switching connection unit so as to connect said second out-of-town exchange corresponding to an out-of-town exchange number with at least one of said first local exchange and said first out-of-town exchange that is a sending source of the dial signal when said second operation signal detector detects the operation signal and said out-of-town exchange number recognized by said second out-of-town exchange number recognizer is an out-of-town exchange number other than the out-of-town exchange number of the first out-of-town exchange, and to keep the communication channel without breaking the channel until satisfying said predetermined breaking condition even if said first telephone is on the hook.

5. A telephone exchange system a forth in claim 1, wherein after said first telephone is on the hook, said first local exchange and said first out-of-town exchange breaks the established communication channel if said first telephone is not off the hook until a predetermined hour has passed, or if off-hook and on-hook are successively performed during the predetermined hour.

6. A switching connection method for controlling a switching connection between telephones in a telephone exchange network having a plurality of out-of-town exchanges interconnected with each other, local exchanges connected to said out-of-town exchanges, and telephones connected to said local exchanges, the method comprising the steps of:

in a first local exchange, keeping a communication channel established between a first telephone connected to the first local exchange and a first out-of-town exchange associated with the first local exchange without breaking the communication channel until satisfying a predetermined breaking condition even if said first telephone is on the hook, when a connection has been established between said first out-of-town exchange and said first telephone having issued the call, in reply to a call under a predetermined condition; and in said first out-of-town exchange, keeping a communication channel established between at least one of said first local exchange and said first out-of-town exchange, and at least one of a second out-of-town exchange and a second local exchange without breaking the communication channel until satisfying said predetermined breaking condition even if said first telephone is on the hook, when, in reply to a call under said predetermined condition, the connection has been established between at least one of said first local exchange and said first out-of-town exchange of a sending party of the call and at least one of said second out-of-town exchange and said second local exchange of a sending destination of the call.

7. A switching connection method as set forth in claim 6, further comprising the steps of:

in said first local exchange, receiving a dial signal sent from said first telephone;

checking whether the received dial signal includes an operation signal;

recognizing an out-of-town exchange number included in the dial signal when detecting the operation signal;

connecting said first out-of-town exchange corresponding to the recognized out-of-town exchange number with said first telephone having issued the dial signal when detecting the operation signal; and keeping the communication channel without breaking the channel until satisfying said predetermined breaking condition even if said first telephone is on the hook, after the above connection when detecting the operation signal.

8. A switching connection method as set forth in claim 6, further comprising the steps of:

in said first out-of-town exchange, receiving a dial signal transferred from at least one of said first local exchange and said second out-of-town exchange;

checking whether the received dial signal includes an operation signal;

recognizing an out-of-town exchange number included in the dial signal when detecting the operation signal;

connecting said second local exchange corresponding to said local exchange number included in the new dial signal with at least one of said first local exchange and said first out-of-town exchange that is a sending source of the new dial signal in time of the reception of a new dial signal including a local exchange number and a subscriber phone number of a connecting destination, when detecting the operation signal and when the recognized out-of-town exchange number is the out-of-town exchange number of the first out-of-town exchange;

connecting said second out-of-town exchange corresponding to said out-of-town exchange number with at least one of said first local exchange and said first out-of-town exchange that is a sending source of the dial signal when detecting the operation signal and when the recognized out-of-town exchange number is an out-of-town exchange number other than the out-of-town exchange number of the first out-of-town exchange; and keeping the communication channel without breaking the channel until satisfying said predetermined breaking condition even if said first telephone is on the hook, after the connection when detecting the operation signal.

9. A switching connection method as set forth in claim 6, further comprising the steps of:

in said first local exchange, receiving a dial signal sent from said first telephone;

checking whether the received dial signal includes an operation signal;

recognizing a out-of-town exchange number included in the dial signal when detecting the operation signal;

connecting said first out-of-town exchange corresponding to the recognized out-of-town exchange number with said first telephone having issued the dial signal when detecting the operation signal; and keeping the communication channel without breaking the communication channel until satisfying said predetermined breaking condition even if said first telephone is on the hook, after the above connection when detecting the operation signal, while in said first out-of-town exchange, receiving a dial signal transferred from at least one of said first local exchange and said second out-of-town exchange;

checking whether the received dial signal includes an operation signal;

recognizing an out-of-town exchange number included in the dial signal when detecting the operation signal;

connecting said second local exchange corresponding to said local exchange number included in the new dial signal with at least one of said first local exchange and said first out-of-town exchange that is a sending source of the new dial signal in time of the reception of a new dial signal including a local exchange number and a subscriber phone number of a connecting destination, when detecting the operation signal and when the recognized out-of-town exchange number is the out-of-town exchange number of the first out-of-town exchange;

connecting said second out-of-town exchange corresponding to said out-of-town exchange number with at least one of said first local exchange and said first out-of-town exchange that is a sending source of the dial signal when detecting the operation signal and when the recognized out-of-town exchange number is an out-of-town exchange number other than the own out-of-town exchange number of the first out-of-town exchange; and keeping the communication channel without breaking the channel until satisfying said predetermined breaking condition even if said first telephone is on the hook, after the connection when detecting the operation signal.

10. A switching connection method as set forth in claim 6, further comprising a step of breaking the established communication channel if said first telephone is not off the hook until a predetermined hour has passed, or if off-hook and on-hook are successively performed during the predetermined hour, after said first telephone was on the hook, in said first local exchange and said first out-of-town exchange.

11. A computer readable memory storing a computer program for controlling a switching connection between telephones by use of an out-of-town exchange and a local exchange, in a telephone exchange network having a plurality of out-of-town exchanges interconnected with each other, local exchanges connected to said out-of-town exchanges, and telephone connected to said local exchanges, the computer program executing the steps of:

by the computer program in a first local exchange, keeping a communication channel established between a first telephone connected to the first local exchange and a first out-of-town exchange associated with the first local exchange without breaking the communication channel until satisfying a predetermined breaking condition even if said first telephone is on the hook, when the connection has been established between said first out-of-town exchange and said first telephone having issued the call, in reply to a call under a predetermined condition; and by the computer program in said first out-of-town exchange, keeping a communication channel established between at least one of said first local exchange and said first out-of-town exchange and at least one of a second out-of-town exchange a second local exchange and associated with the second out-of-town exchange without breaking the communication channel until satisfying said predetermined breaking condition even if said first telephone is on the hook, when, in reply to a call under said predetermined condition, the connection has been established between at least one of said first local change and said first out-of-town exchange of a sending party of the call and at least one of said second out-of-town exchange and the second local exchange of a sending destination of the call.

12. A computer readable memory as set forth in claim 11, wherein the computer program in said first local exchange executes the steps of:

receiving a dial signal sent from said first telephone;

checking whether the received dial signal includes an operation signal;

recognizing an out-of-town exchange number included in the dial signal when detecting the operation signal;

connecting said first out-of-town exchange corresponding to the recognized out-of-town exchange number with said first telephone having issued the dial signal when detecting the operation signal; and keeping the communication channel without breaking the communication channel until satisfying said predetermined breaking condition even if said first telephone is on the hook, after the above connection when detecting the operation signal.

13. A computer readable memory as set forth in claim 11, wherein the computer program in said first out-of-town exchange executes the steps of;

receiving a dial signal transferred from at least one of said first local exchange and said second out-of-town exchange;

checking whether the received dial signal includes an operation signal;

recognizing an out-of-town exchange number included in the dial signal when detecting the operation signal;

connecting said second local exchange corresponding to said local exchange number included in the new dial signal with at least one of said first local exchange and said first out-of-town exchange that is a sending source of the new dial signal in time of the reception of a new dial signal including a local exchange number and a subscriber phone number of a connecting destination, when detecting the operation signal and when the recognized out-of-town exchange number is said out-of-town exchange number of the first out-of-town exchange;

connecting said second out-of-town exchange corresponding to said out-of-town exchange number with at least one of said first local exchange and said first out-of-town exchange that is a sending source of the dial signal when detecting the operation signal and when the recognized out-of-town exchange number is an out-of-town exchange number other than the out-of-town exchange number of the first out-of-town exchange; and keeping the communication channel without breaking the channel until satisfying said predetermined breaking condition even if said first telephone is on the hook, after the connection when detecting the operation signal.

14. A computer readable memory as set forth in claim 11, wherein the computer program in said first local exchange executes the steps of:

receiving a dial signal sent from said first telephone;

checking whether the received dial signal includes an operation signal;

recognizing an out-of-town exchange number included in the dial signal when detecting the operation signal;

connecting said first out-of-town exchange corresponding to the recognized out-of-town exchange number with said first telephone having issued the dial signal when detecting the operation signal; and keeping the communication channel without breaking the communication channel until satisfying said predetermined breaking condition even if said first telephone is on the hook, after the above connection when detecting the operation signal, while the computer program in said first out-of-town exchange executes the steps of:

receiving a dial signal transferred from at least one of said first local exchange and said second out-of-town exchange;

checking whether the received dial signal includes an operation signal, recognizing an out-of-town exchange number included in the dial signal when detecting the operation signal;

connecting said second local exchange corresponding to the local exchange number included in the new dial signal with at least one of said first local exchange and said first out-of-town exchange that is a sending source of the new dial signal in time of the reception of a new dial signal including a local exchange number and a subscriber phone number of a connecting destination, when detecting the operation signal and when the recognized out-of-town exchange number is the out-of-town exchange number of the first out-of-town exchange;

connecting said second out-of-town exchange corresponding to the out-of-town exchange number with at least one of said first local exchange and said first out-of-town exchange that is a sending source of the dial signal when detecting the operation signal and when the recognized out-of-town exchange number is the out-of-town exchange number other than the out-of-town exchange number of the first out-of-town exchange; and keeping the communication channel without breaking the channel until satisfying said predetermined breaking condition even if said first telephone is on the hook, after the connection when detecting the operation signal.

15. A computer readably memory as set forth in claim 11, wherein the computer program in said first local exchange and said first out-of-town exchange breaks the established communication channel if said first telephone is not off the hook until a predetermined hour has passed, or if off-hook and on-hook are successively performed during the predetermined hour, after said telephone was once on the hook, in the first local exchange and said first out-of-town exchange.

* * * * *